(12) United States Patent
Crooks

(10) Patent No.: US 11,610,189 B2
(45) Date of Patent: *Mar. 21, 2023

(54) VIDEOCONFERENCING WITH A CUSTOMER DEVICE

(71) Applicant: Diebold Nixdorf, Incorporated, North Canton, OH (US)

(72) Inventor: W. Edward Crooks, Copley, OH (US)

(73) Assignee: Diebold Nixdorf Incorporated, Hudson, OH (US)

( * ) Notice: Subject to any disclaimer, the term of this patent is extended or adjusted under 35 U.S.C. 154(b) by 176 days.

This patent is subject to a terminal disclaimer.

(21) Appl. No.: 17/085,773

(22) Filed: Oct. 30, 2020

(65) Prior Publication Data

US 2021/0056522 A1  Feb. 25, 2021

Related U.S. Application Data

(63) Continuation of application No. 15/486,757, filed on Apr. 13, 2017, now Pat. No. 10,825,002.
(Continued)

(51) Int. Cl.
*G06Q 40/00* (2012.01)
*G06Q 20/10* (2012.01)
(Continued)

(52) U.S. Cl.
CPC ... *G06Q 20/1085* (2013.01); *G06K 19/06037* (2013.01); *G06Q 20/18* (2013.01);
(Continued)

(58) Field of Classification Search
CPC ...... G06Q 40/00; G06Q 20/085; G06Q 20/18; G06Q 20/3276; G06Q 30/016; G06Q 40/02; H04W 76/14; H04W 4/80; H04W 84/12; G06K 19/06037; G06F 19/202; G06F 19/203; G06F 19/206; G06F 19/211
See application file for complete search history.

(56) References Cited

U.S. PATENT DOCUMENTS 9,290,927 B1 *   3/2016  Sheley ............... E04H 1/06
11,087,297 B1 *  8/2021  Thomas ............. G06Q 20/326
2017/0286930 A1* 10/2017  Hao .................. G07F 19/206

FOREIGN PATENT DOCUMENTS

KR   2007042365 A  *  4/2007

OTHER PUBLICATIONS

SIM Based Automation of Inter-Networked Banking and Teller Machine Operations using FPGA AVP Reddy, NPR Reddy—scholar.archive.org (Year: 2013).*

* cited by examiner

*Primary Examiner* — Lalita M Hamilton
(74) *Attorney, Agent, or Firm* — Black McCuskey

(57) ABSTRACT

In an example embodiment, there is described herein an automated banking machine with a user interface that enables a customer perform a financial transaction. The automated banking machine also comprises a first interface for communicating with a remote service provide and a second interface that can communicate with a customer service device. Upon receiving an input from the customer requesting assistance, the automated banking machine establishes a communication link between the remote service provider and the customer device. The communication link enables audio, video, or a combination of audio and video data to be sent between the customer device and the remote service provider.

20 Claims, 7 Drawing Sheets

Related U.S. Application Data

(60) Provisional application No. 62/322,011, filed on Apr. 13, 2016.

(51) Int. Cl.

| | |
|---|---|
| *H04W 76/14* | (2018.01) |
| *H04W 4/80* | (2018.01) |
| *G06Q 30/016* | (2023.01) |
| *G06Q 40/02* | (2023.01) |
| *G06Q 20/32* | (2012.01) |
| *G06Q 20/18* | (2012.01) |
| *G07F 19/00* | (2006.01) |
| *G06K 19/06* | (2006.01) |
| *H04B 5/00* | (2006.01) |
| *H04W 84/12* | (2009.01) |

(52) U.S. Cl.
CPC ....... *G06Q 20/3276* (2013.01); *G06Q 30/016* (2013.01); *G06Q 40/02* (2013.01); *G07F 19/202* (2013.01); *G07F 19/203* (2013.01); *G07F 19/206* (2013.01); *G07F 19/211* (2013.01); *H04B 5/0031* (2013.01); *H04W 4/80* (2018.02); *H04W 76/14* (2018.02); *H04W 84/12* (2013.01)

VIDEOCONFERENCING WITH A CUSTOMER DEVICE

CROSS REFERENCE TO RELATED APPLICATIONS

This application is a continuation of U.S. patent application Ser. No. 15/486,757, now U.S. Pat. No. 10,825,002, that claims the benefit under 35 U.S.C. § 119(e) of U.S. Patent Application No. 62/322,011 filed on Apr. 13, 2016, the contents of which are hereby incorporated by reference herein.

TECHNICAL FIELD

This disclosure relates to automated banking machines.

BACKGROUND

Automated banking machines are employed to allow a customer to conduct financial transactions, such as deposits and withdrawals, without having to visit a bank teller. A convenience provided by automated banking machines is that they allow customers to perform financial transactions outside of normal banking hours. The types of banking transactions a customer can carry out are determined by the capabilities of the particular banking machine and the programming of the institution operating the machine. A common type of automated banking machine used by consumers is an automated teller machine (or "ATM") which enables customers to carry out banking transactions.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine, automated teller machine (ATM), or automated transaction machine shall be deemed to include any machine that may be used to automatically carry out transactions involving transfers of value.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
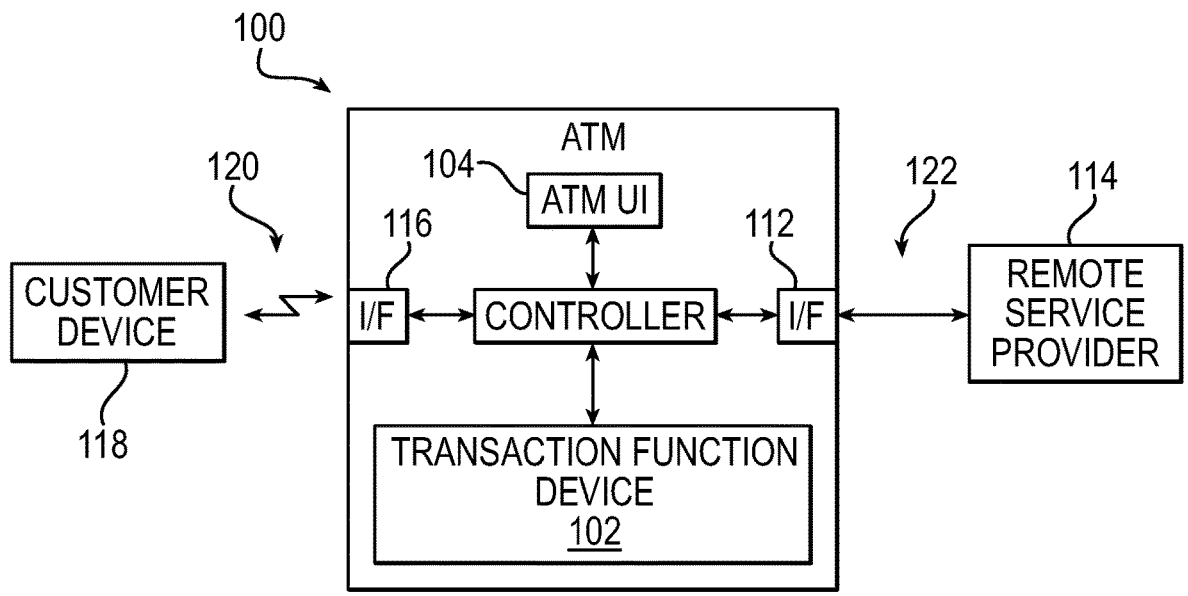
FIG. 1 is a block diagram illustrating an example of an automated banking machine that allows a customer using a customer device to videoconference with a remote service provider

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an example embodiment, there is described herein an automated banking machine with a user interface that enables a customer to perform a financial transaction. The automated banking machine also comprises a first interface for communicating with a remote service provider and a second interface that can communicate with a customer service device. Upon receiving an input from the customer service requesting assistance, the automated banking machine establishes a communication link between the remote service provider and the customer device. The communication link enables audio, video, or a combination of audio and video data to be sent between the customer device and the remote service provider.

In accordance with an example embodiment, there is disclosed herein, a non-transitory, tangible computer readable medium of instructions with instructions encoded thereon for execution by a processor, and when executed operable to provide a user interface enabling a customer to provide data to perform a financial transaction and dispense funds via a transaction function device. Upon receiving an input requesting help from a customer service representative, the instructions are operable to establish a communication link between a customer service representative disposed on a first network with a customer device associated with the customer on a second network. The communication link enables one of a group consisting of audio, visual, and audiovisual communication between the customer and the customer service representative.

In accordance with an example embodiment, there is disclosed herein a method that comprises obtaining data representative of a customer at an automated banking machine for performing a financial transaction. Upon receiving a request to communicate with a representative, the request comprising data representative of a customer device associated with the customer, a communication link is established between the customer device and a remote station associated with a representative responsive to the input. The communication link provides data to the customer service device that comprises either audio, video, or both audio and video data to the customer service device.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in example embodiments herein are automated banking machines that allow users to perform financial transactions. The users can request a videoconference employing their user device, for example a mobile device such as a Smartphone, tablet computer, or laptop computer. Although the example embodiments described herein employ an automated teller machine ("ATM"), those skilled in the art should readily appreciate that the example embodiments herein can be employed with any suitable type of automated banking machine, therefore, the principles of the example embodiments described herein should not be construed as being limited to ATMs.

FIG. 1 is a block diagram illustrating an example of an automated banking machine, such as an ATM, 100 that allows a customer using a customer device 118 to videoconference with a remote service provider 114 As those skilled in the art can readily appreciate, the customer device 118 may be any suitable device such as a Smartphone, laptop, tablet computer, or other portable computing platform capable of interacting with the ATM 100.

The ATM 100 comprises a user interface (ATM UI) 104 that allows the customer to perform financial transactions. As will be described in more detail herein, the user interface may comprise one or any combination of two or more of a display, wireless transceiver (receiver and transmitter), card reader, touch screen, personal identification number (PIN) pad, encrypting PIN pad (EPP), audio (e.g., voice command) or video (e.g. gestures) input devices, keypad, optical scanner etc.

The ATM 100 further comprises a transaction function device 102. The transaction function device 102 may be any suitable device or combination of two or more devices for performing financial transactions. Some examples of transaction function devices include, but are not limited to a cash dispenser, a cash acceptor, a cash recycler, check dispenser, a printer (e.g., receipt, check, or other financial document), or a deposit device such as a check acceptor.

In the example illustrated in FIG. 1, the ATM 100 further comprises a first interface 112 for communicating with a remote service provider 114 (e.g., a remote teller or customer service representative) on a first communication link 122 and a second interface 114 for communicating with a customer device 118 on a second communication link 120. The first and second communication links 122, 120 may be wireless links, wired links, or a combination of wired and wireless links.

A controller 110 is coupled with the user interface 104, the transaction function device 102, the first interface 112, and the second interface 116. The controller 110 comprises logic that is operable to perform financial transactions employing the transaction function device 102 based on data obtained via the user interface 104. "Logic", as used herein, includes but is not limited to hardware, firmware, software and/or combinations of each to perform a function(s) or an action (s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software that performs the desired functionality when executed by a processor.

In an example embodiment, the controller 110 is operable to establish a communication link that comprises communication links 120, 122 between the customer device 118 and the remote service provider responsive to an input received from the customer. For example, the customer may select an option that is displayed on the user interface 104. As another example, the customer may employ an application on the customer device 118 to request help from a customer service representative or other person. The communication link between the remote service provider 114 and customer device 118 allows a customer to employ the customer device 118 to communicate with a remote service provider 114 while the customer is conducting a financial transaction. As will be described herein, the controller 110 may selectively provide audio, video, or data representative of an interface for performing the transaction to the customer device 118 or the ATM user interface 104. The interface for performing the transaction can provide prompts to the user for conducting the transaction. For example the interface for performing the transaction may include a visual interface (e.g., a menu or other prompts are provided on a display for a user to conduct the transaction) or an audio interface that can allow the user to hear prompts and in particular embodiments, provide voice commands.

In an example embodiment, the controller 110 provides audio and video on data communication link 120 to the customer device 118 so that the videoconference is conducted on the user device 118. In particular embodiments, the ATM User Interface inputs and outputs can be redirected to the user device 118.

Figure 2:
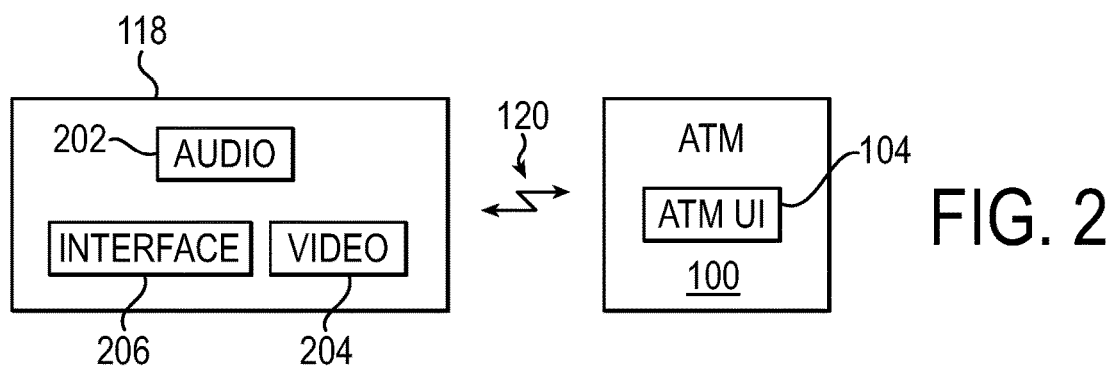
FIG. 2 is a block diagram illustrating an example of where audio and video input/output, and ATM user interface displays are provided on the customer device.

FIG. 2 is a block diagram illustrating an example of where audio component of the videoconference 202 and video component of the videoconference 204, and an interface for performing the transaction 206 are provided by the customer device 118. The controller 110 provides the data for the audio component of the videoconference 202, the video component of the videoconference, and data representative of an interface (e.g., menus, prompts) for conducting the transaction across link 120 to the customer device 118. In particular embodiments, no interface for performing the transaction is provided on the ATM user interface 104 (e.g., the display may be blanked and/or no audio signals are output by the ATM 100).

The example embodiment illustrated in FIG. 2 can aid a handicapped user who may be unable to reach all or a portion of the ATM user interface 104. The remote service provider 114 may be able to provide the inputs to the ATM user interface 104 for the customer or provide highlights on the ATM user interface 104 for the transaction to show the customer how to conduct the transaction.

Figure 10:
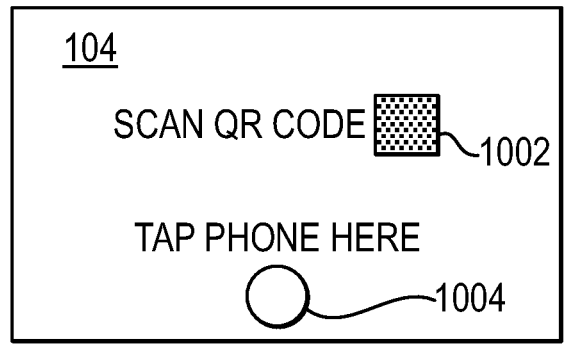
FIG. 10 is a block diagram illustrating an example of additional options for initiating a videoconference with a remote service provider.

This embodiment may also be useful for a user of an ATM where the user interface does not include traditional devices such as a keypad, card reader, or display. An example of such an ATM is the Irving Concept being developed by Diebold, the applicant of this application, which employs an application on a user device (e.g., customer device 118) for setting up a transaction, and then the user taps a near field communication (NFC) interface (not shown, see e.g., FIG. 10) to perform the transaction. For example, if a user is having problems operating the ATM 100, an interface for conducting the transaction 206 may be provided by the application on the customer device 118. The user can request a videoconference, and the audio component of the videoconference 202 and the video component of the videoconference 204 can also be provided on the customer device 118. In particular embodiments, the remote service provider 114 may be able to operate, or provide highlights or other inputs on the interface for conducting the transaction 206 to aid a customer in performing a transaction.

Figure 3:
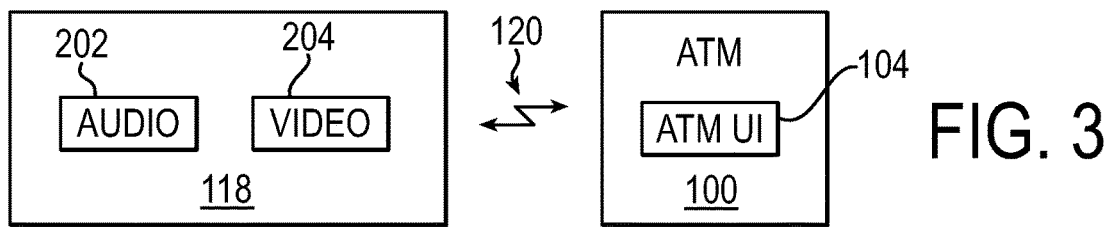
FIG. 3 is a block diagram illustrating an example of where audio and video input/output are provided through the customer device while the ATM user interface is provided by the ATM.

FIG. 3 is a block diagram illustrating an example embodiment where audio component of the videoconference 202 and video component of the videoconference 204 are provided through the customer device 118 while the ATM user interface 104 is employed for conducting the transaction. This can allow a customer to perform the transaction on the ATM while conducting the videoconference on the customer device 118.

Figure 4:
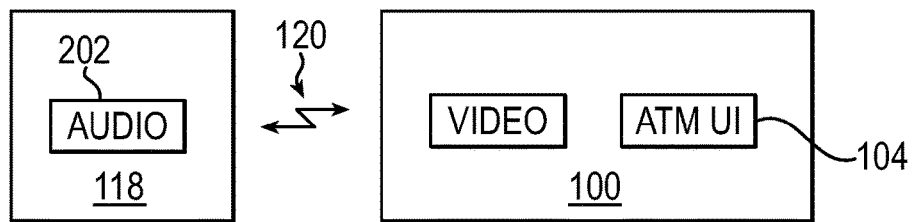
FIG. 4 is a block diagram illustrating an example of where audio input/output is provided via the customer device while video input/output and the ATM user interface are provided by the ATM.

FIG. 4 illustrates an example where the audio component of the videoconference 202 is provided by the customer device 118. The video component of the videoconference 204, and interface for conducting the representation are provided on the ATM user interface 104.

Figure 5:
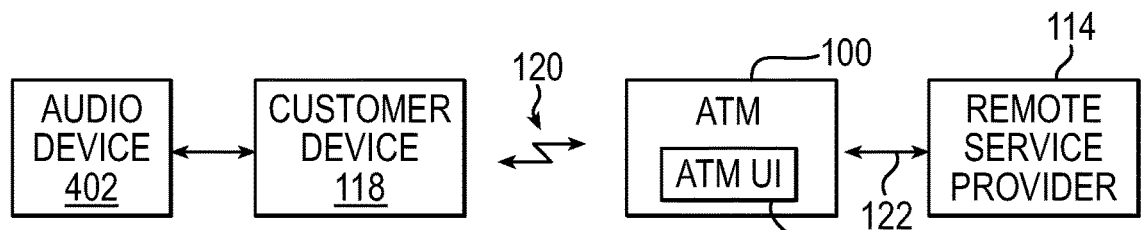
FIG. 5 is a block diagram illustrating an example of a customer device that is coupled with an audio device.
Figure 6:
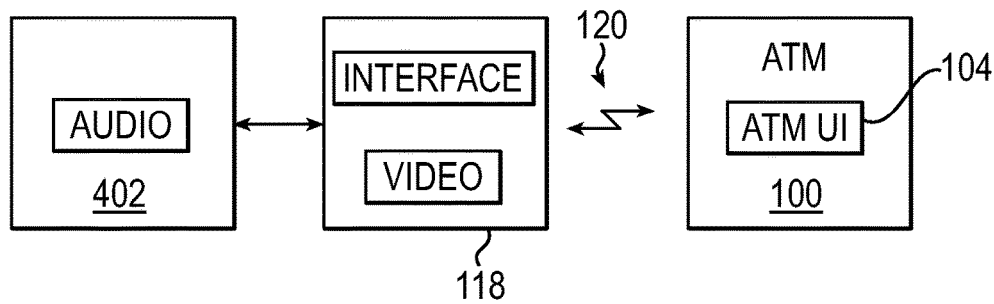
FIG. 6 is a block diagram illustrating an example of where video input/output and the ATM user interface are provided by the customer device, and the audio input/output is provided by an audio device coupled with the customer device.
Figure 7:
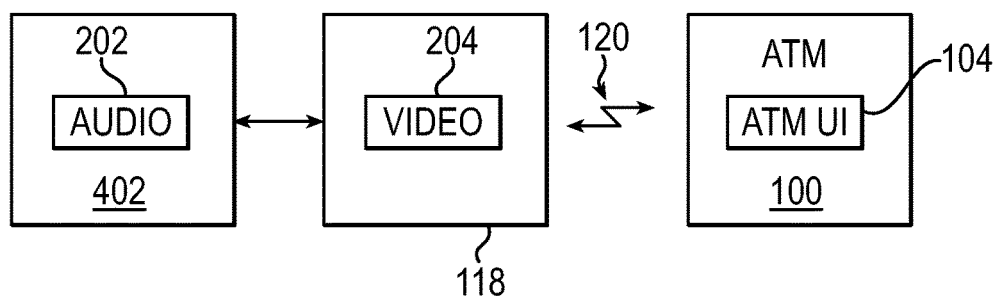
FIG. 7 is a block diagram illustrating an example of where the ATM user interface is provided by the ATM, video signals are provided audio input/output is provided by an audio device associated with the customer device, the video input/output is provided by the customer device, and the ATM user interface is provided by the ATM.
Figure 8:
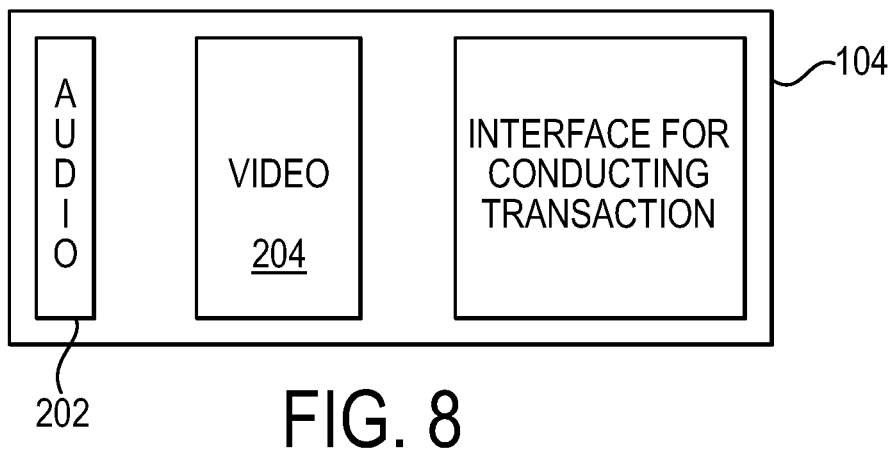
FIG. 8 is a block diagram illustrating an example of the audio and video input/output, and ATM user interface being provide by the ATM.

FIGS. 5-7 illustrate examples where the customer deice 206 is coupled with a remote audio device 402, such as, for example a BLUETOOTH headset. In FIG. 6 the video component of the videoconference 204 and a representation of the user interface for conducting the transaction 206 are provided by the customer device 118, and the audio component of the video conference 202 is provided by the audio device 402 coupled with the customer device 118. In FIG. 7 the interface for conducting the transaction 206 is provided by the ATM user interface 104, the video component of the videoconference 204 is provided on the customer device 118 while the audio component of the videoconference 202 is provided by the audio device 402 associated with the customer device 118, FIG. 8 illustrates an example embodiment where the audio component of the videoconference 202, the video component of the videoconference 204, and the representation of the user interface for performing the transaction 206 are provided by the ATM user interface 104. However, the videoconference may be initiated by the customer device 118. For example, when requesting a videoconference, the customer may be provided with prompts to indicate where the customer would like to receive the audio, video, and interface for conducting the transaction. The inputs/outputs may then be selectively provided based on the customer's responses.

Figure 9:
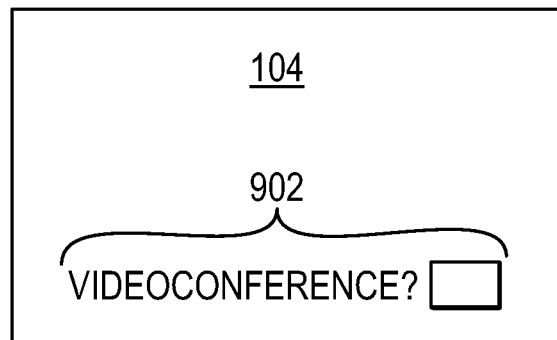
FIG. 9 is a block diagram illustrating an example of an option for initiating a video conference with a remote service provider.

FIG. 9 is a block diagram illustrating an example of an option for initiating a video conference with a remote service provider 114. In this example, the controller provides a visual indicia 902 on the representation of the user interface for the transaction 206 (which may be displayed on either the ATM UI 104 or on the customer device 118) to enable the customer device to establish a communication link between the customer device and the controller. Upon requesting a videoconference or assistance from the remote service provider 114, the customer may be instructed to scan a barcode, such as a QR code with the customer device 118 as indicated by 1002 in FIG. 10 or to tap the customer device 118 on the NFC interface as indicated by 1004 in FIG. 10. The QR code or the NFC interface may provide the customer device 118 with data for communicating with the controller 110, so that the customer device 118 can communicate with the controller 110 and the controller 110 can setup the communication link between the customer device 118 and the remote service provider 114. Alternatively, a QR code and/or the NFC interface may be provided on the ATM user interface 104 to enable the customer to initiate the videoconference with the remote service provider 114 without having to first select the visual indicia 902 illustrated in FIG. 9.

Figure 11:
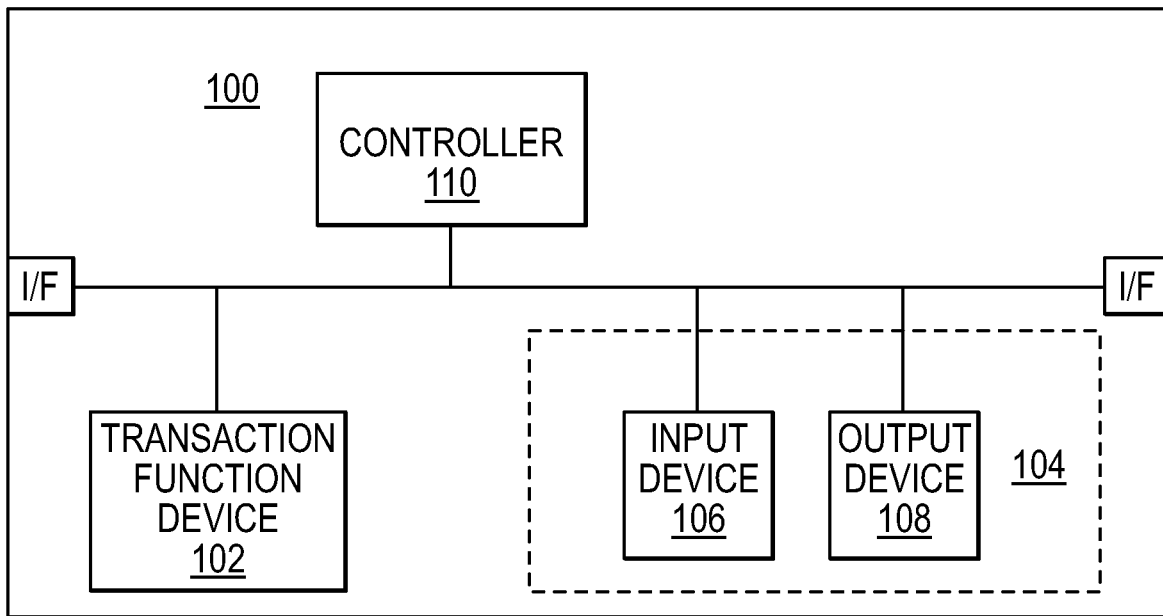
FIG. 11 is a block diagram illustrating an example of an automated banking machine upon which an example embodiment may be implemented.

FIG. 11 is a block diagram illustrating an example of an automated banking machine 100, such as an automated teller machine or "ATM". The automated banking machine 100 comprises a transaction function device 102 a user interface 104, and a controller 110. The user interface 104 comprises an input device 106 and an output device 108.

Figure 12:
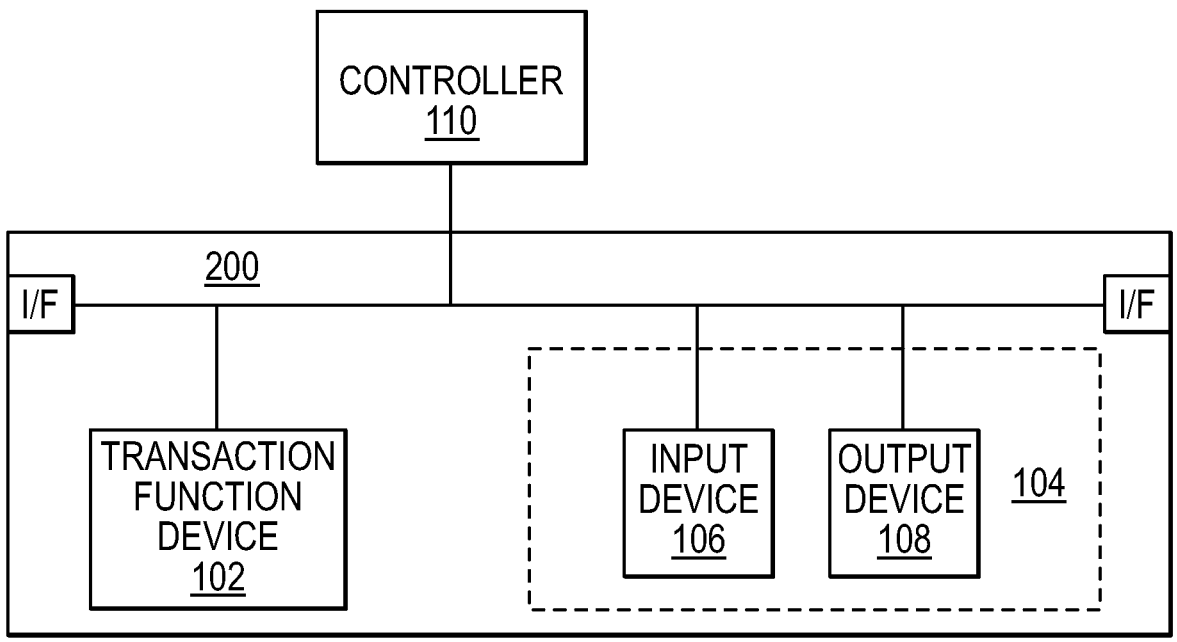
FIG. 12 is a block diagram illustrating an example of an automated banking machine upon which an example embodiment may be implemented where the controller is located remotely.

FIG. 12 is a block diagram illustrating an example of an automated banking machine 200 where the controller 110 is located remotely. In particular embodiments, the controller 110 may control the operation of a plurality of automated banking machines 100.

Figure 13:
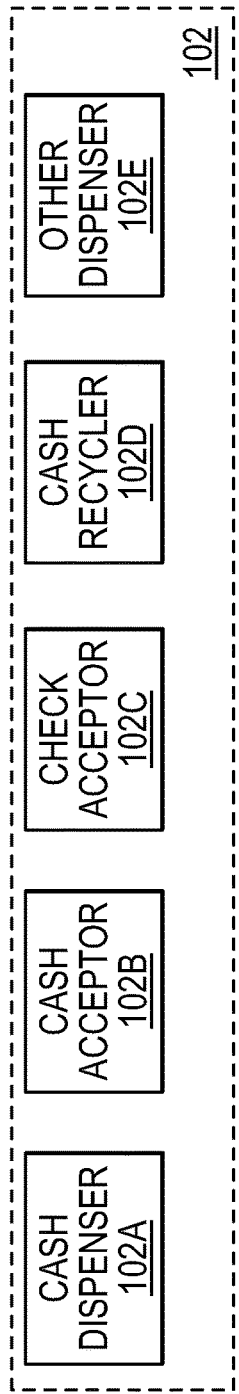
FIG. 13 is block diagram illustrating examples of transaction function devices for an automated banking machine.

FIG. 13 is block diagram illustrating examples of transaction function devices 102 for an automated banking machine 100. The example embodiments described herein may comprise any one, or combination of two or more of a cash dispenser 102A, a cash acceptor 102B, a check acceptor 102C, a cash recycler 102D, or any other suitable type of transaction function device such as a deposit device or a dispenser 102E. Examples of other types of transaction function devices include, but are not limited to, a receipt printer, a check printer, a money order printer, or any type of negotiable instrument printer.

Figure 14:
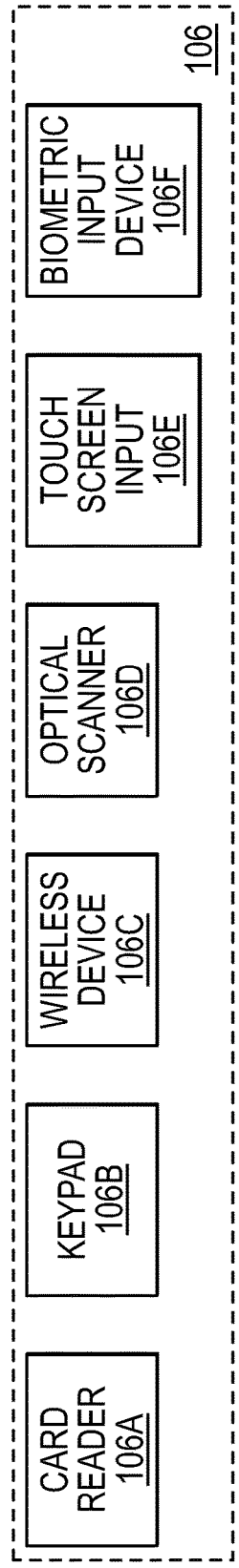
FIG. 14 is block diagram illustrating examples of input devices for an automated banking machine.

FIG. 14 is block diagram illustrating examples of input devices 106 for an automated banking machine 100. The example embodiments described herein may comprise any one, or combination of two or more of a card reader 106A, a keypad 106B, a wireless device 106 (the wireless device 106C may suitably comprise a transceiver suitable to receive any suitable type of wireless protocol, including but not limited to WIFI, BLUETOOTH, Near Field Communication ("NFC"), or multiple transceivers that may be suitable with any combination of the aforementioned protocols), an optical scanner 106D (for example in particular embodiments the optical scanner 106D may be a bar code scanner that can read a barcode, such as a Quick Response Code (QR CODE), a check reader, or both), and a touch screen input 106E. Other embodiments may include other types of input devices such as a biometric input device 106F.

Figure 15:
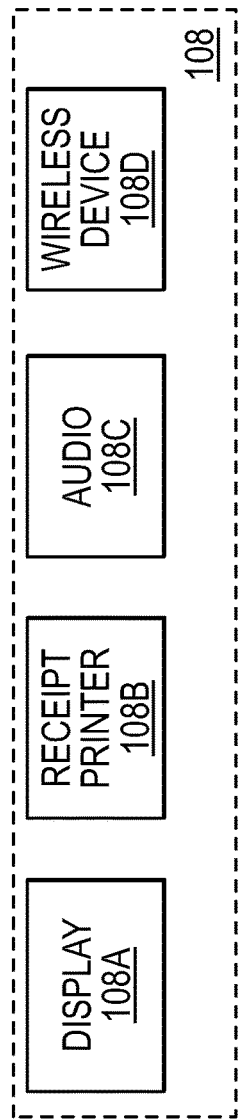
FIG. 15 is block diagram illustrating examples of output devices for an automated banking machine.

FIG. 15 is block diagram illustrating examples of output devices 108 for an automated banking machine 100. The example embodiments described herein may comprise any one, or combination of two or more of a display 108A (in particular embodiments, the display 108A may be coupled with a touch screen input 106E (FIG. 14), a receipt printer 108B, an Audio device 108C (in particular embodiments, the audio device 108C may include a jack (not shown) enabling a user to plug in headphones, and a wireless device 108D (the wireless device 108C may suitably comprise a transceiver suitable to transmit data via any suitable type of wireless protocol, including but not limited to WIFI, BLUETOOTH, NFC, or multiple transceivers that may be suitable with any combination of the aforementioned protocols).

Figure 16:
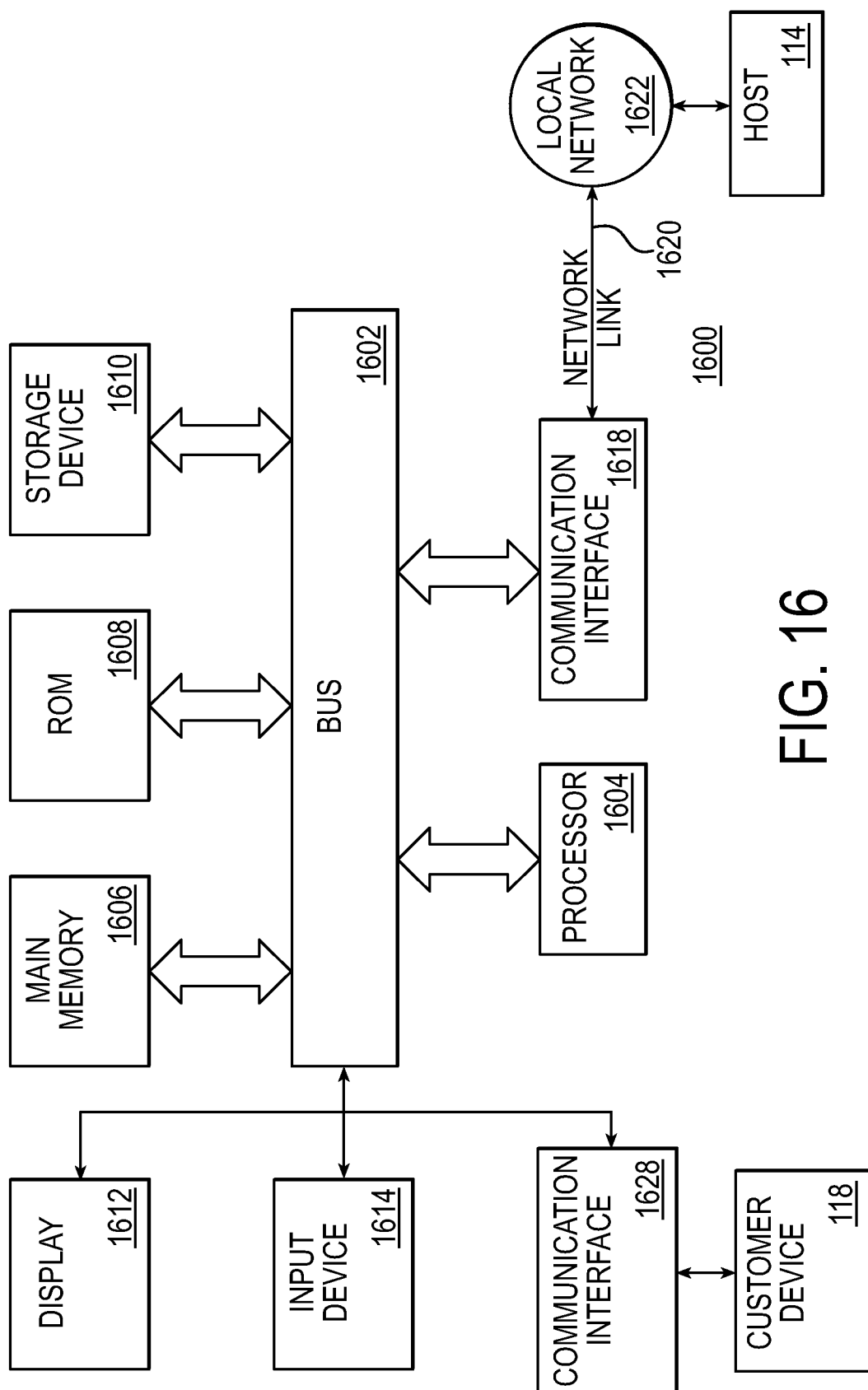
FIG. 16 is block diagram illustrating an example of a computer system upon which an example embodiment can be implemented.
Figure 17:
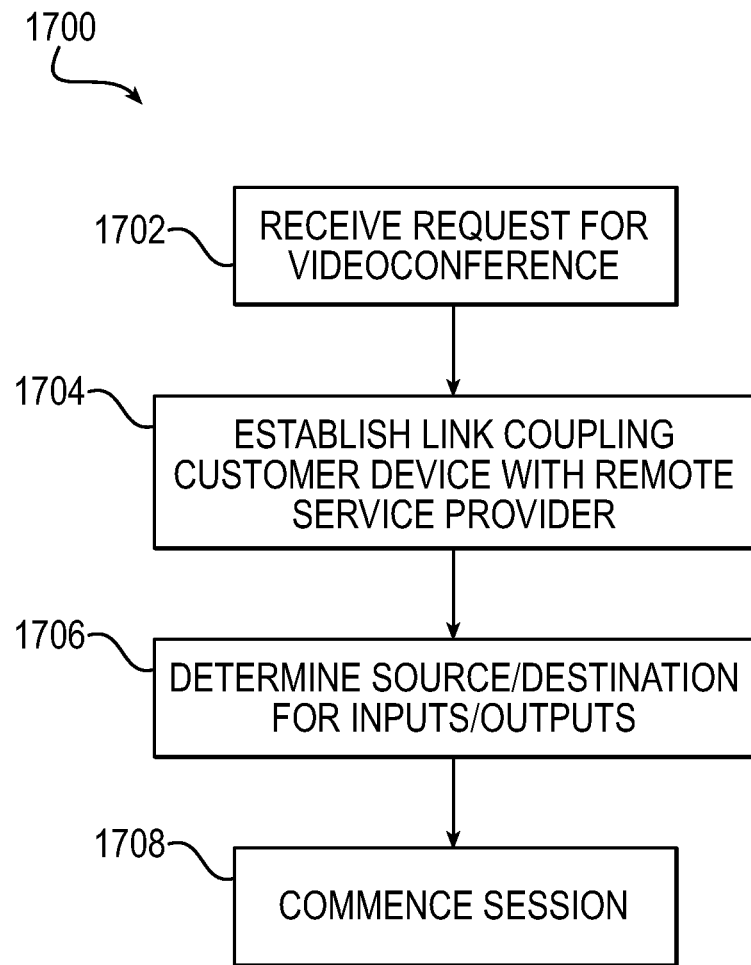
FIG. 17 is block diagram illustrating an example of a methodology for providing videoconferencing with a customer device.

FIG. 16 is a block diagram that illustrates a computer system 1600 upon which an example embodiment may be implemented. For example, computer system 1600 may be employed to implement the controller 110 (FIGS. 1, 11, 12)

Computer system 1600 includes a bus 1602 or other communication mechanism for communicating information and a processor 1604 coupled with bus 1602 for processing information. Computer system 1600 also includes a main memory 1606, such as random access memory (RAM) or other dynamic storage device coupled to bus 1602 for storing information and instructions to be executed by processor 1604. Main memory 1606 also may be used for storing a temporary variable or other intermediate information during execution of instructions to be executed by processor 1604. Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612 such as a cathode ray tube (CRT) or liquid crystal display (LCD), for displaying information to a computer user. An input device 1614, such as a keyboard including alphanumeric and other keys is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g. x) and a second axis (e.g. y) that allows the device to specify positions in a plane.

Computer system 1600 also includes a communication interface 1618 coupled with bus 1602. Communication interface 1618 provides a two-way data communication coupling computer system 1600 to a network link 1620 that is connected to a local network 1622. For example, the remote service provider 114 may employ a host that is coupled with the local network 1622.

Communication interface 1618, may be a local area network (LAN) card to provide a data communication connection to a compatible LAN. As another example, communication interface 1618 may be an integrated services digital network (ISDN) card or a modem to provide a data communication connection to a corresponding type of telephone line. Wireless links may also be implemented. In any such implementation, communication interface 1618 sends and receives electrical, electromagnetic, or optical signals that carry digital data streams representing various types of information.

Computer system 1600 also include communication interface 1628 coupled with bus 1602. Communication interface 1628 provides two way data communication coupling computer system with customer device 118. Communication interface 1628 may suitably be any wired or wireless or a combination wired and wireless interface. This can allow customer device 118 to wirelessly communicate with customer interface 1620 or employ a wired interface that enables a user to employ a wired device (e.g., a plug, such as for example an Ethernet connector or a USB connector) to communicate with communication interface 1628.

An aspect of the example embodiment is related to the use of computer system 1600 for videoconferencing with a customer device. For example data may be communicated between remote customer service provider 114 and customer device 118 via communication interfaces 1618, 1628 respectively and bus 1602. According to an example embodiment, videoconferencing with a customer device is provided by computer system 1600 in response to processor 1604 executing one or more sequences of one or more instructions contained in main memory 1606. Such instructions may be read into main memory 1606 from another computer-readable medium, such as storage device 1610. Execution of the sequence of instructions contained in main memory 1606 causes processor 1604 to perform the process steps described herein. One or more processors in a multi-processing arrangement may also be employed to execute the sequences of instructions contained in main memory 1606. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 1604 for execution. Such a medium may take many forms, including but not limited to non-volatile media. Non-volatile media include for example optical or magnetic disks, such as storage device 1610. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 1604 for execution. For example, the instructions may initially be borne on a magnetic disk of a remote computer. The remote computer can load the instructions into its dynamic memory and send the instructions over a telephone line using a modem. A modem local to computer system 1600 can receive the data on the telephone line and use an infrared transmitter to convert the data to an infrared signal. An infrared detector coupled to bus 1602 can receive the data carried in the infrared signal and place the data on bus 1602. Bus 1602 carries the data to main memory 1606 from which processor 1604 retrieves and executes the instructions. The instructions received by main memory 1606 may optionally be stored on storage device 1610 either before or after execution by processor 1604.

In view of the foregoing structural and functional features described above, a methodology 1700 in accordance with an example embodiment will be better appreciated with reference to FIG. 1700. While, for purposes of simplicity of explanation, the methodology of FIG. 1700 is shown and described as executing serially, it is to be understood and appreciated that the example embodiment described herein is not limited by the illustrated order, as some aspects could occur in different orders and/or concurrently with other aspects from that shown and described herein. Moreover, not all illustrated features may be required to implement a methodology in accordance with an example embodiment. The methodology 1700 described herein is suitably adapted to be implemented in hardware, software when executed by a processor, or a combination thereof.

At 1702, a request is received for a videoconference. The request may be received from a customer who is authenticated with the banking machine (for example via data obtained from a card reader and PIN pad, or from a wireless interface, such as a NFC interface). In particular embodiments, the customer may initiate a videoconference without authenticating with the automated banking machine. In an example embodiment, the customer can request the videoconference be conducted on their mobile device.

For example, the ATM may provide an input allowing a customer to request a videoconference. For example, a button may be provided on a keypad, an icon on a touch screen, or any other suitable method. In an example embodiment, the customer may employ an application on the customer device and have the request wirelessly transmitted to the ATM (for example via a NFC or BLUETOOTH interface).

At 1704, a link coupling a customer device with a remote service provider is established. In an example embodiment, separate links may be established with the remote service provider and the customer device. The automated banking machine may provide data to the customer device for establishing the link. For example, a QR code may be employed which the customer device can scan and obtain keying material or other parameters for a secure session. In another embodiment, a NFC interface may be employed. For example, when the customer device is in data communication with a NFC interface, keying material or other parameters for establishing the link may be exchanged via the NFC interface. The resulting connection may employ another type of wireless link, e.g., optical, BLUETOOTH, or any other suitable wireless protocol. In yet another embodiment, the customer device may be coupled with the ATM machine via a wired interface. For example, an Ethernet coupler or a Universal Serial Bus (USB) connector, RS232 or any other suitable type of wired device may be employed.

In an example embodiment, at 1706, the source and destination for inputs/outputs for the videoconference, and optionally an interface for a transaction are determined. For example, the user may be prompted whether one, a combination, or all of video, audio, or the automated banking machine's interface should be provided to the customer device. For example, the customer may elect for the audio portion of the videoconference to be performed on the customer device while the video portion of the videoconference is performed on the automated banking machine's interface. As another example, the customer may elect to have the video, audio, and interface provided by the customer's device (and optionally elect to turn off the automated banking machine's user interface). However, those skilled in the art should readily appreciate that default settings may be employed which can be helpful where the user is unable select the destination for the input/outputs for the videoconference and optionally the At 1708, the videoconferencing session begins. The audio and video portions of the videoconference are directed as specified in 1706. In an example embodiment, a default can be setup for the audio and optionally the interface for the transaction. For example, the videoconference can employ the user device while the automated banking machine's user interface is employed for providing an interface for conducting a transaction.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A method, comprising:
    operating a controller of an automated banking machine that comprises a user interface, a transaction function device, a first interface coupled with a first network providing communications with a remote service provider, and a second interface operable to communicate with a mobile device, wherein the controller is coupled with the user interface, the transaction function device, the first interface, and the second interface, to perform financial transactions employing the transaction function device based on data obtained via the user interface;
    establishing, by the controller a communication link that comprises a wireless communication link between the mobile device via the second interface and the remote service provider via the first interface responsive to an input received via the user interface; and
    wherein the wireless communication link allows a customer to employ the mobile device to communicate via the wireless communication link with a remote service provider while the customer is conducting a financial transaction.

2. The method according to claim 1, wherein the wireless communication link provides audio and video data between the mobile device and the remote service provider.

3. The method according to claim 2, wherein the controller is operable to provide data representative of an interface for performing the financial transaction to the mobile device, and not displaying transactional data on the user interface.

4. The method according to claim 2, further comprising providing, by the controller, an interface for performing the financial transaction on the user interface.

5. The method according to claim 1, wherein the transaction function device is selected from a group consisting of a cash dispenser, a cash acceptor, a check acceptor, and a cash recycler.

6. The method according to claim 1, wherein the user interface comprises an input device selected from a group consisting of a card reader, a keypad, a wireless receiver, an optical scanner, and a touch screen input.

7. The method according to claim 1, wherein the user interface comprises an output device selected from a group consisting of a video display, a receipt printer, an audio output, and a wireless transmitter.

8. The method according to claim 1, wherein the second interface employs one of a group consisting of BLUETOOTH and WIFI for communicating with the mobile device.

9. A method comprising:
operating a controller of an automated banking machine banking machine coupled with a user interface, a transaction function device, a first interface coupled with a first network providing communications with a remote service provider, and a second interface operable to communicate with a mobile device to perform financial transactions employing the transaction function device based on data obtained via the user interface;
causing, by the controller a visual indicia that comprises a quick response code to display on the user interface to enable the mobile device to establish a communication link between the mobile device and the controller;
receiving an input via the user interface that comprises data from the quick response code; and
establishing, by the controller, wireless communication link between the mobile device and the second interface and a second communication link between the remote service provider and the first interface responsive to receiving the input;
wherein the wireless communication link and the second communication link allows the mobile device via the second interface to wirelessly communicate with the remote service provider via the first interface while the customer is performing the financial transaction.

10. The method according to claim 9 wherein the wireless communication link and the second communication link provides audio and video data between the mobile device and the remote service provider.

11. The method according to claim 9, providing, by the controller data representative of an interface for performing the financial transaction to the mobile device, and not displaying transactional data on the user interface.

12. The method according to claim 9, wherein the second interface employs one of a group consisting of BLUETOOTH and WIFI for communicating with the mobile device.

13. The method according to claim 9,
wherein the transaction function device is selected from a group consisting of a cash dispenser, a cash acceptor, a check acceptor, and a cash recycler;
wherein the user interface comprises an input device selected from a group consisting of a card reader, a keypad, a wireless receiver, an optical scanner, and a touch screen input; and
wherein the user interface comprises an output device selected from a group consisting of a video display, a receipt printer, an audio output, and a wireless transmitter.

14. The method according to claim 9, further comprising providing, by the controller keying information in the quick response code presented to the mobile device to establish the communication link between the mobile device and the second interface.

15. A method, comprising:
operating a controller of an automated banking machine coupled with a user interface that comprises a near field communication transceiver, a transaction function device, a first interface coupled with a first network providing communications with a remote service provider, and a second interface operable to communicate with a mobile device to perform financial transactions employing the transaction function device based on data obtained via the user interface;
receiving an input via the user interface; and
establishing, by the controller employing the near field communication transceiver, a wireless communication link between the mobile device via the second interface and the remote service provider via the first interface responsive to receiving the input;
wherein the wireless communication link allows a customer to employ the mobile device to communicate via the wireless communication link with a remote service provider while the customer is conducting a financial transaction.

16. The method according to claim 15, further comprising sending, by the controller, keying information to the mobile service device for via the near field communication transceiver to establish the communication link between the mobile device and the second interface.

17. The method according to claim 15, wherein the second interface employs one of a group consisting of BLUETOOTH and WIFI for communicating with the mobile device.

18. The method according to claim 15, wherein the wireless communication link provides audio and video data between the mobile device and the remote service provider.

19. The method according to claim 15, further comprising providing, by the controller, data representative of an interface for performing the financial transaction to the mobile device, and not displaying transactional data on the user interface.

20. The method according to claim 15,
wherein the transaction function device is selected from a group consisting of a cash dispenser, a cash acceptor, a check acceptor, and a cash recycler;
wherein the user interface comprises an input device selected from a group consisting of a card reader, a keypad, a wireless receiver, an optical scanner, and a touch screen input; and
wherein the user interface comprises an output device selected from a group consisting of a video display, a receipt printer, an audio output, and a wireless transmitter.

* * * * *